(12) United States Patent
Chen et al.

(10) Patent No.: US 10,300,532 B2
(45) Date of Patent: May 28, 2019

(54) CLAMP FOR TOOL HOLDER

(71) Applicant: Kennametal Inc., Latrobe, PA (US)

(72) Inventors: Shi Chen, Huntingdon, PA (US); Qi Wang, Greensburg, PA (US); Igor Kaufmann, Nuremberg (DE); Jason Won Goldsmith, Greensburg, PA (US); Yingwei Wu, Oxford (GB)

(73) Assignee: KENNAMETAL INC., Latrobe, PA (US)

( * ) Notice: Subject to any disclaimer, the term of this patent is extended or adjusted under 35 U.S.C. 154(b) by 40 days.

(21) Appl. No.: 15/632,985

(22) Filed: Jun. 26, 2017

(65) Prior Publication Data

US 2018/0369923 A1  Dec. 27, 2018

(51) Int. Cl.
| | |
|---|---|
| *B27B 27/10* | (2006.01) |
| *B23C 5/28* | (2006.01) |
| *B23B 29/00* | (2006.01) |
| *B23B 27/10* | (2006.01) |
| *B23B 27/16* | (2006.01) |
| *B23B 27/00* | (2006.01) |
| *B23Q 11/10* | (2006.01) |

(52) U.S. Cl.
CPC .............. *B23B 27/10* (2013.01); *B23B 27/16* (2013.01); *B23C 5/28* (2013.01); *B23B 27/00* (2013.01); *B23B 2250/12* (2013.01); *B23B 2260/03* (2013.01); *B23Q 11/10* (2013.01); *B23Q 11/1076* (2013.01)

(58) Field of Classification Search
CPC ..... B23Q 11/1076; B23Q 11/10; B23B 27/10; B23B 2260/03; B23B 2205/02; B23B 2250/12
See application file for complete search history.

(56) References Cited

U.S. PATENT DOCUMENTS

| | | | | |
|---|---|---|---|---|
| 160,161 | A * | 2/1875 | Clay ....................... | B23B 27/10 407/11 |
| 522,588 | A * | 7/1894 | Chouteau ............... | B23Q 11/10 407/11 |
| 5,148,728 | A * | 9/1992 | Mazurkiewicz ....... | B23Q 11/10 407/11 |
| 5,718,156 | A * | 2/1998 | Lagrolet ................ | B23B 27/10 407/11 |
| 8,727,674 | B2 | 5/2014 | Baca, Jr. et al. | |
| 10,007,246 | B2 * | 6/2018 | Grant ................... | G05B 19/182 |

(Continued)

*Primary Examiner* — Sara Addisu
(74) *Attorney, Agent, or Firm* — Ian K. Samways

(57) ABSTRACT

A clamp for a tool holder is disclosed. The clamping tool holder includes a body having an insert-receiving pocket and a threaded clamp-receiving bore with a coolant opening for receiving pressurized coolant from a coolant source. A clamp includes a threaded aperture extending from a top surface to a bottom surface and coolant passages in fluid communication with a coolant header. A clamp screw is threaded into the threaded aperture of the clamp. The clamp screw includes a plurality of coolant passages in fluid communication with the coolant opening of the body, and at least one coolant channel in fluid communication with the coolant passage. Coolant from the coolant source enters the coolant opening of the body, travels into the clamp screw, travels into each coolant passage of the clamp, and then exits the clamp in a direction toward a cutting insert-workpiece interface.

18 Claims, 11 Drawing Sheets

(56) References Cited

U.S. PATENT DOCUMENTS

| | | | | |
|---|---|---|---|---|
| 10,029,313 B2* | 7/2018 | Kaufmann | | B23B 27/10 |
| 2003/0082018 A1* | 5/2003 | Kraemer | | B23B 27/10 |
| | | | | 407/11 |
| 2006/0263153 A1* | 11/2006 | Isaksson | | B23B 27/065 |
| | | | | 407/113 |
| 2007/0283794 A1* | 12/2007 | Giannetti | | B23B 27/10 |
| | | | | 82/158 |
| 2007/0286689 A1* | 12/2007 | Giannetti | | B23B 27/10 |
| | | | | 407/11 |
| 2008/0124180 A1* | 5/2008 | Breisch | | B23B 27/10 |
| | | | | 407/110 |
| 2008/0279644 A1* | 11/2008 | Endres | | B23B 27/10 |
| | | | | 408/56 |
| 2010/0196105 A1* | 8/2010 | Amstibovitsky | | B23B 27/10 |
| | | | | 407/11 |
| 2011/0116879 A1* | 5/2011 | Mochizuki | | B23B 27/1677 |
| | | | | 407/107 |
| 2011/0305531 A1* | 12/2011 | Amstibovitsky | | B23B 27/10 |
| | | | | 407/11 |
| 2011/0311323 A1 | 12/2011 | Hecht | | |
| 2012/0230780 A1* | 9/2012 | Henry | | B23B 27/10 |
| | | | | 407/11 |
| 2013/0129428 A1* | 5/2013 | Henry | | B23B 27/04 |
| | | | | 407/11 |
| 2013/0202372 A1* | 8/2013 | Hecht | | B23B 27/10 |
| | | | | 407/107 |
| 2014/0030033 A1* | 1/2014 | Luik | | B23B 27/10 |
| | | | | 407/11 |
| 2014/0099168 A1* | 4/2014 | Schaefer | | B23B 27/10 |
| | | | | 407/11 |
| 2014/0133924 A1* | 5/2014 | Oren | | B23B 29/043 |
| | | | | 407/11 |
| 2014/0169890 A1* | 6/2014 | Chen | | B23Q 11/1023 |
| | | | | 407/11 |
| 2014/0334887 A1* | 11/2014 | Flolo | | B23B 27/10 |
| | | | | 407/11 |
| 2015/0132074 A1* | 5/2015 | Boissonnet | | B23B 29/043 |
| | | | | 407/11 |
| 2015/0352640 A1* | 12/2015 | Frota de Souza Filho | | |
| | | | | B23B 27/10 |
| | | | | 407/11 |
| 2016/0339523 A1* | 11/2016 | Graf | | B23B 27/10 |

* cited by examiner

US 10,300,532 B2

CLAMP FOR TOOL HOLDER

FIELD OF THE INVENTION

The present invention pertains to a tool holder and a clamp for clamping cutting inserts. More particularly, the present invention relates to a clamp for a tool holder, the clamp having a plurality of coolant holes for delivering coolant to the cutting insert-workpiece interface.

BACKGROUND OF THE INVENTION

In a cutting operation, such as, for example, a grooving operation, a grooving or cutting insert engages a workpiece to remove material from the workpiece. In some cutting assemblies, an upper seat and a lower seat retain the cutting insert.

Material removal operations can generate heat at the interface between the cutting insert and the workpiece. Typically, it is advantageous to provide coolant to the vicinity of the interface between the cutting insert and the workpiece.

Even though conventional arrangements deliver coolant, it remains highly desirable to provide a tool holder that delivers coolant in an efficient fashion to the interface between the cutting insert and the workpiece. This is especially true for a cutting operation in which the cutting insert engages the workpiece surface at the outside diameter (i.e., outside workpiece surface) for cutting a groove. During the cutting operation, as the depth of the groove increases, the difficulty connected with coolant delivery to the cutting insert-workpiece interface increases. As can be appreciated, it would very beneficial to provide a tool holder that delivers coolant to the cutting insert-workpiece interface even as the depth of the groove increases during the cutting operation.

SUMMARY OF THE INVENTION

The problem of delivering coolant to the cutting insert-workpiece interface is solved by providing a clamp for a tool holder having a plurality of coolant holes for delivering coolant to the cutting insert-workpiece interface. The coolant holes can be arranged to deliver coolant to the cutting insert-workpiece interface in the most effective manner, such as a fan-like pattern, and the like.

In one aspect of the invention, a tool holder comprises a body including an insert-receiving pocket formed at a forward end thereof. The insert-receiving pocket has a bottom and at least one side wall for receiving a cutting insert. The forward end has a threaded clamp-receiving bore with a coolant opening for receiving pressurized coolant from a coolant source. A clamp includes a body portion, a neck portion, and a tapered nose portion. The body portion includes a top surface and a bottom surface. A threaded aperture extends from the top surface to the bottom surface. The clamp further includes a plurality of coolant passages in fluid communication with the threaded aperture. Each coolant passage has an outlet port. A clamp screw is threaded into the threaded aperture of the clamp and is at least partially received in the threaded clamp-securing bore of the tool holder body. The clamp screw includes a coolant passage in fluid communication with the coolant opening of the body, and at least one coolant channel in fluid communication with the coolant passage. Coolant from the coolant source enters the coolant opening, travels into the clamp screw, travels into the coolant passage, travels into the at least one coolant channel of the clamp screw, travels into each of the plurality of coolant passages of the clamp, and then exits through each outlet port in a direction toward a cutting insert-workpiece interface.

In another aspect of the invention, a clamp for a tool holder comprising a body portion, a neck portion, and a tapered nose portion, the body portion including a top surface and a bottom surface, a threaded aperture extending from the top surface to the bottom surface, the clamp further including a plurality of coolant passages in fluid communication with the threaded aperture, each coolant passage having an outlet port for providing coolant to a cutting insert-workpiece interface.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
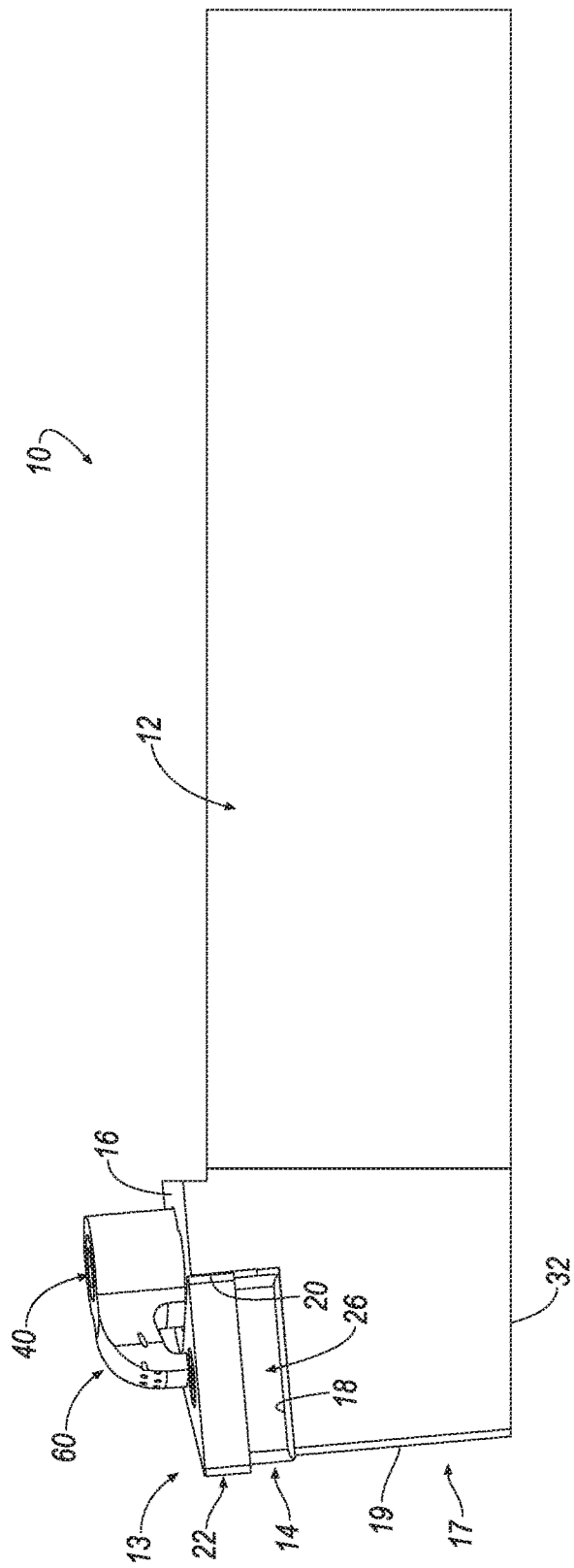
FIG. 1 is a side view of a tool holder with a clamp in accordance with an embodiment of the invention.
Figure 2:
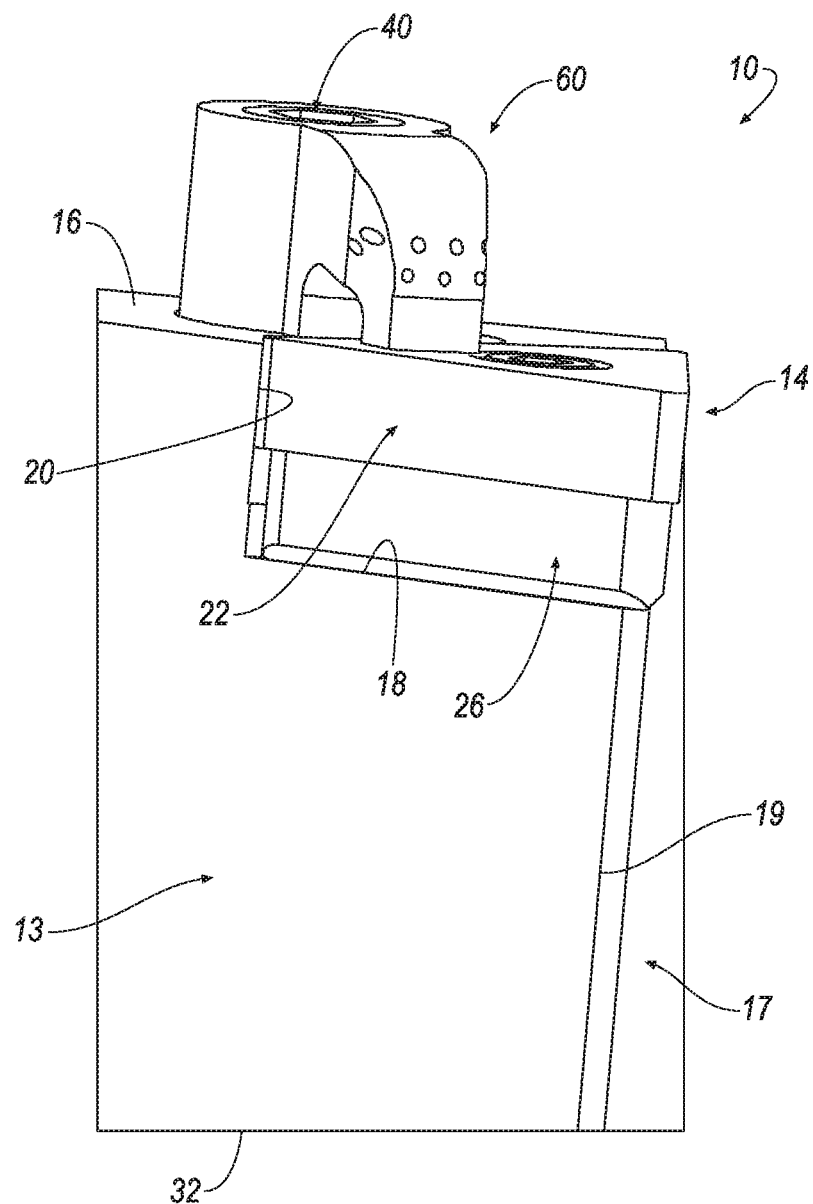
FIG. 2 is a front view of the tool holder and clamp of FIG. 1.
Figure 3:
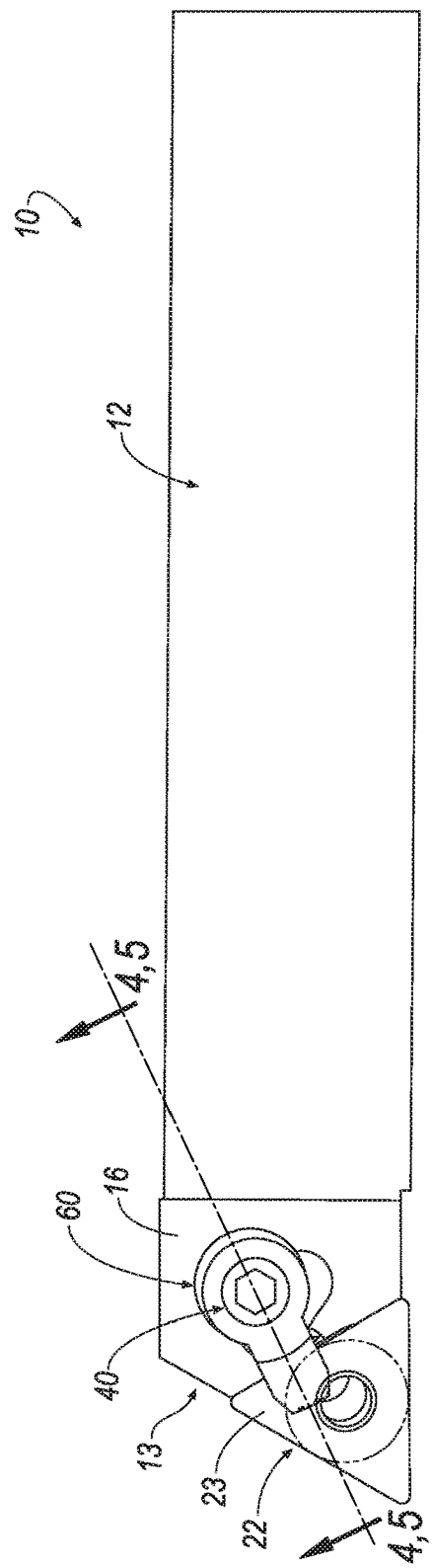
FIG. 3 is a top view of the tool holder and clamp of FIG. 1.

Referring now to FIGS. 1-5, a tool holder 10 is shown according to an embodiment of the invention. The tool holder 10 comprises a body 12 with a head portion 13 having an insert-receiving pocket 14 formed in its upper surface 16 at a corner 19 of its forward end 17. The insert receiving pocket 14 has a bottom 18 and a rear support wall 20.

In the illustrated embodiment, a cutting insert 22 has a top surface 23 and a generally triangular shape. However, it will be appreciated that the cutting insert can have any polygonal shape, such as a diamond, rectangle, pentagon, and the like. An optional seat member 26 can be disposed between the cutting insert 22 and the bottom 18 of the pocket 14 for supporting the cutting insert 22 when mounted in the pocket 14. The seat member 26 can be fixedly secured to the insert-receiving pocket 14 by means of a threaded fastener (not shown), such as a screw, and the like. In an alternative embodiment, the insert 22 can be disposed on the bottom 18 of the pocket 14 without the use of the seat member 26 and the threaded fastener.

Figure 4:
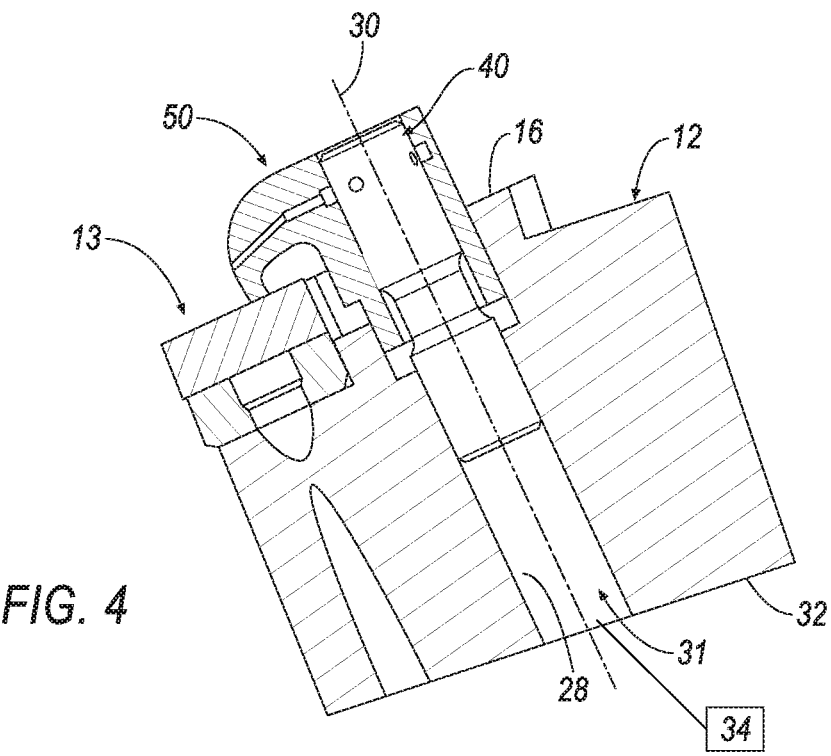
FIG. 4 is a cross-sectional view of the tool holder and clamp taken along line 4-4 of FIG. 3.
Figure 5:
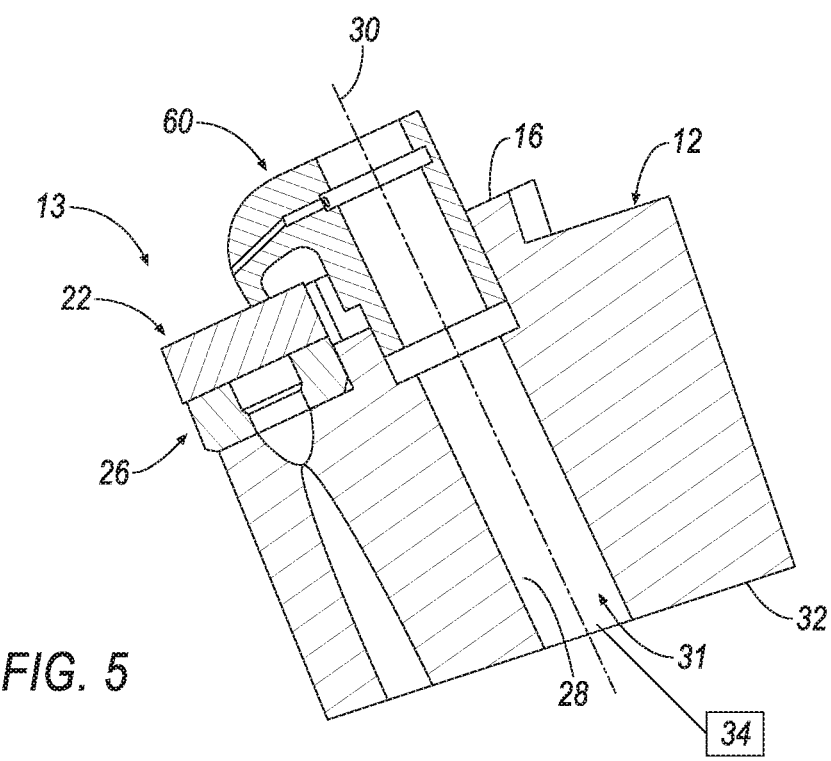
FIG. 5 is a cross-sectional view of the tool holder and clamp with the clamp screw removed for clarity taken along line 5-5 of FIG. 3.
Figure 6:
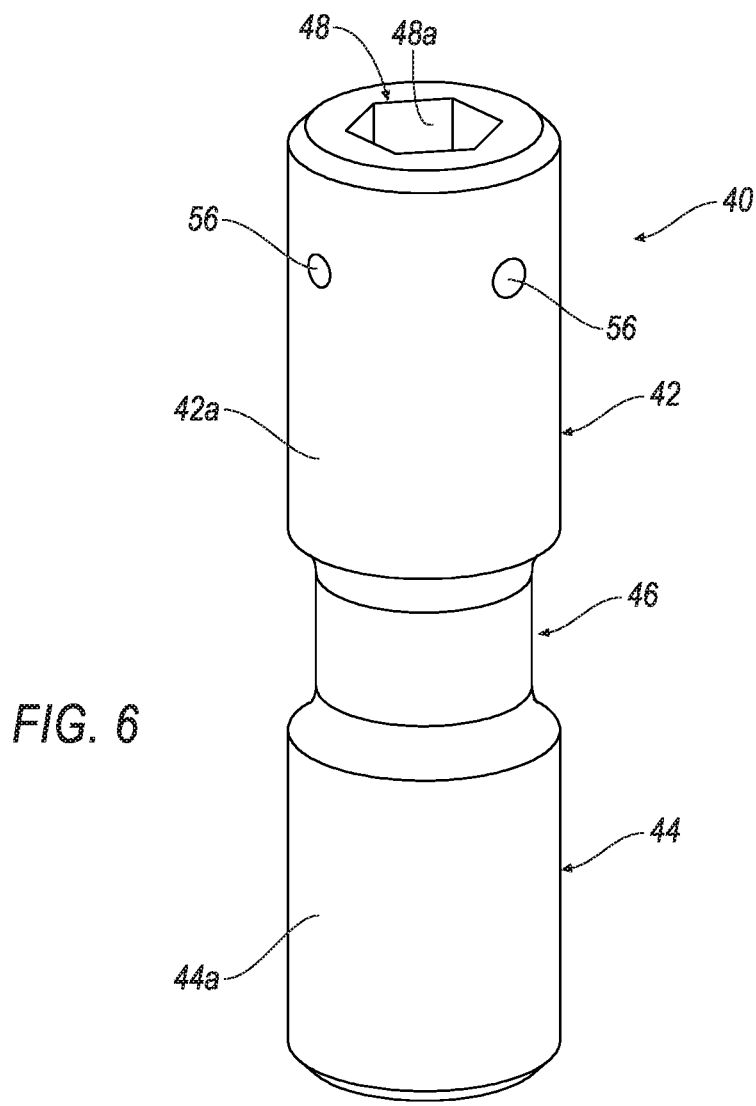
FIG. 6 is an isometric view of a clamp screw in accordance with an embodiment of the invention.
Figure 7:
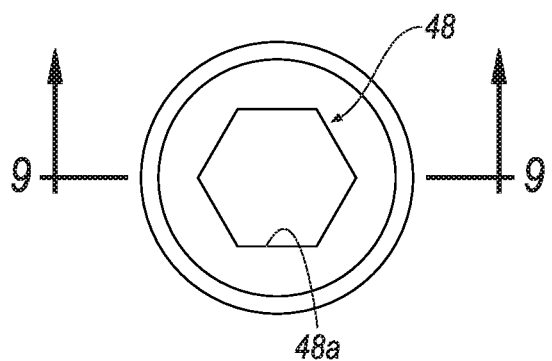
FIG. 7 is a top view of the clamp screw of FIG. 6.
Figure 8:
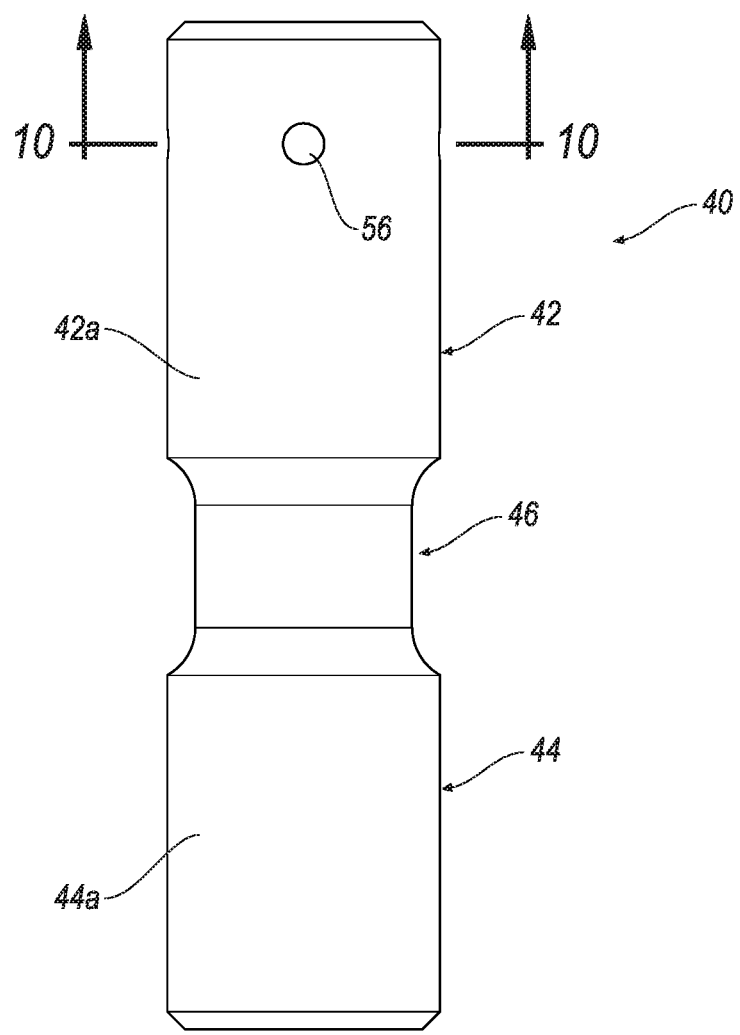
FIG. 8 is a side view of the clamp screw of FIG. 6.
Figure 9:
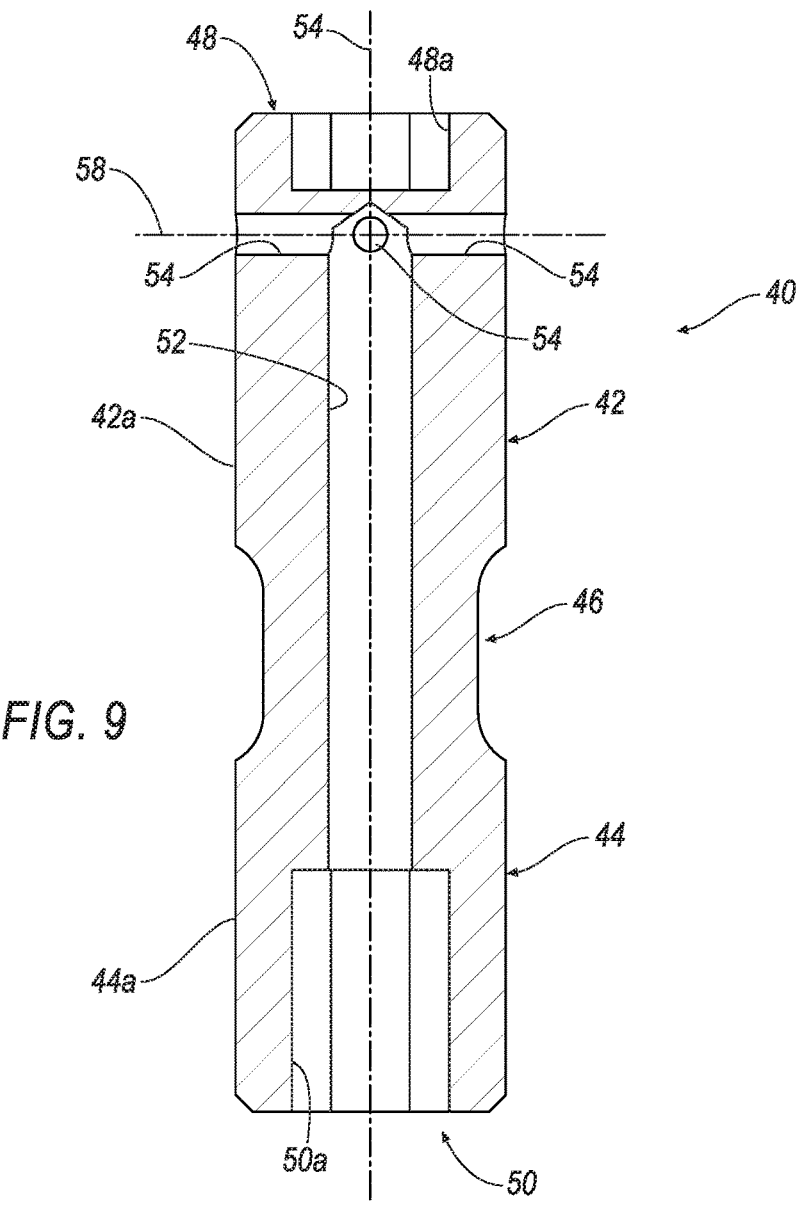
FIG. 9 is a cross-sectional view of the clamp screw taken along line 9-9 of FIG. 7.

As shown in FIGS. 4 and 5, an internally threaded clamp-securing bore 28 with a central, longitudinal axis 30 is formed in the upper surface 16 of the body 12 of the tool holder 10. The central axis 30 is substantially perpendicular to the upper surface 16 of the body 12. The threaded clamp-securing bore 28 includes a coolant inlet opening 31 formed in a bottom surface 32 of the body 12. The coolant inlet opening 31 extends from the bottom surface 32 to the upper surface 16 of the head portion 13 of the body 12. The coolant inlet opening 31 is in fluid communication with a coolant source 34, which is shown in schematic, wherein the coolant source 34 typically is under pressure.

Referring now to FIGS. 6-10, a clamp screw 40 is shown according to an embodiment of the invention. The clamp screw 40 is generally cylindrical in shape and includes an upper portion 42, a lower portion 44 and an intermediate portion 46. In the illustrated embodiment, the intermediate portion 46 has a smaller diameter than the upper portion 42 and the lower portion 44. The upper portion 42 may have the same diameter as the lower portion 44, or a different diameter. The upper portion 42 has a solid end 48 with a hexagonal recess 48a for accommodating a tool, such as an Allen wrench, and the like. The upper portion 42 and the lower portion 44 have a threaded outer surface 42a, 44a, respectively.

The lower portion 44 of the clamp screw 40 has a hollow end 50 with a coolant opening 50a in fluid communication with the coolant opening 31 of the body 12 and a coolant passage 52 extending from the coolant opening 50a along a central, longitudinal axis 54 of the clamp screw 40 to the upper portion 42 of the clamp screw 40. The coolant passage 52 is formed in the clamp screw 40 so that its central, longitudinal axis 54 is substantially concentric with the central, longitudinal axis 30 of the clamp-securing bore 28 when assembled to the tool holder 10. In addition, the coolant passage 52 is in fluid communication with one or more coolant channels 54 that provide coolant through a respective coolant port 56 formed in the upper portion 42 of the clamp screw 40. Each coolant channel 54 has an axis 58 that is substantially perpendicular to the central, longitudinal axis 54 of the clamp screw 40. However, it will be appreciated that the axis 58 of each coolant channel 54 can be formed in such a way to be non-perpendicular to the central, longitudinal axis 54 of the clamp screw 40.

Figure 10:
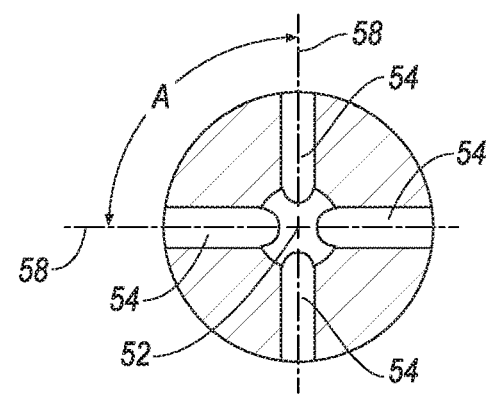
FIG. 10 is a cross-section view of the clamp screw taken along line 10-10 of FIG. 8.
Figure 11:
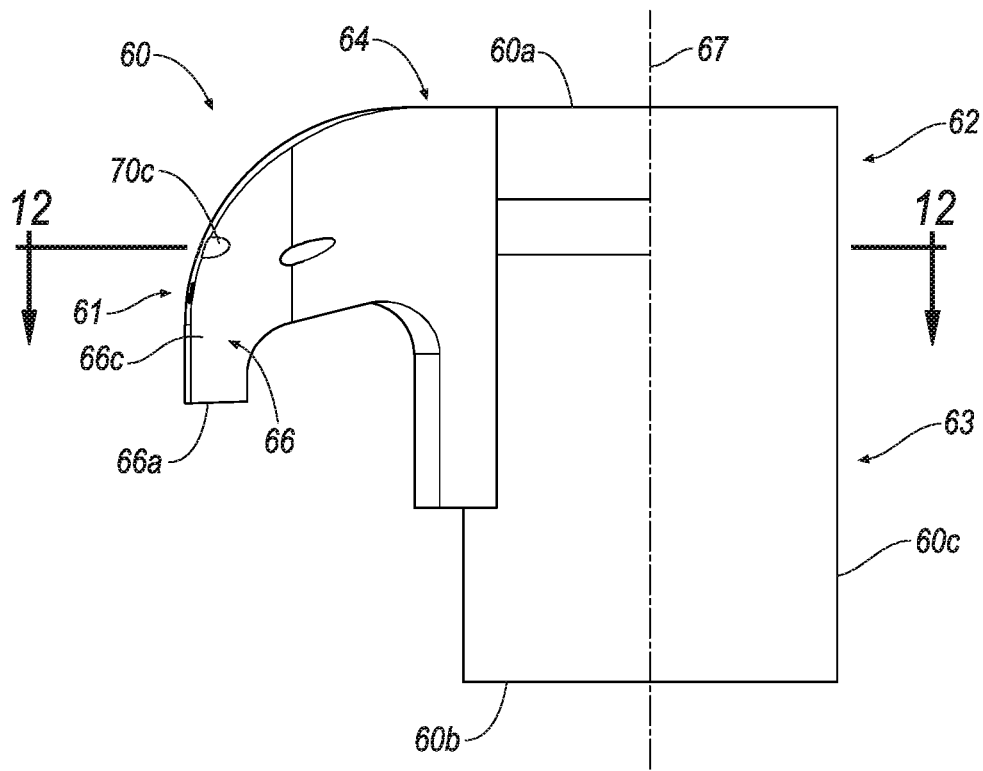
FIG. 11 is side view of a clamp with a plurality of coolant holes in accordance with an embodiment of the invention.

In the illustrated embodiment, the clamp screw 40 has a total of four coolant channels 54 (and coolant ports 56) that are oriented at an angle, A, of approximately 90 degrees (360/4) with respect to each other, as shown in FIG. 10. However, it will be appreciated that the invention is not limited by the number of coolant channels 54 (and coolant ports 56), and that the invention can be practiced with any desirable number of coolant channels 54 (and coolant ports 56) that provide sufficient coolant flow through the clamp screw 40. For example, the clamp screw 40 may have a total of three coolant channels 54 (and coolant ports 56) that are oriented at an angle, A, of approximately 120 degrees (360/3) with respect to each other. In another example, the clamp screw 40 may have a total of six coolant channels 54 (and coolant ports 56) that are oriented at an angle, A, of approximately 60 degrees (360/6) with respect to each other.

As shown in FIGS. 11-16, a clamp 60 is shown according to an embodiment of the invention. The clamp 60 of the invention serves a dual purpose: 1) securely clamping the cutting insert 22 in the pocket 14, and 2) providing coolant to the cutting insert-workpiece interface. In general, the clamp 60 has a body portion 62, a neck portion 64 and a tapered nose portion 66. The clamp 60 also has a forward end 61 and a rearward end 63. The body portion 62 includes a top surface 60a, a bottom surface 60b and a rear surface 60c. The body portion 62 of the clamp 60 has a threaded aperture 65 with a central, longitudinal axis 67 that extends from the top surface 60a to the bottom surface 60b. As shown in FIG. 4, the threaded aperture 64 is formed in the clamp 60 so that its central, longitudinal axis 65 is substantially concentric with the central, longitudinal axis 30 of the clamp-securing bore 28 when assembled to the clamping tool holder 10.

Referring back to FIGS. 11-16, the tapered nose portion 66 has a lower face 66a for engaging the top surface 23 of the insert 22 (i.e., the surface of the cutting insert that is facing upward when the cutting insert is mounted in the pocket), and a pair of side faces 66b, 66c. The forward lower face 66a of the nose portion 66 assists in distributing the downward and rearward force of the clamp 60 over the top surface 23 of the insert 22. The threaded aperture 65 of the clamp 60 includes a coolant header 68 with one or more openings 69. The coolant header 68 is generally cylindrical with a diameter larger than the diameter of the threaded aperture 65 to allow coolant to collect therein, and then be provided through the one or more openings 69.

Figure 12:
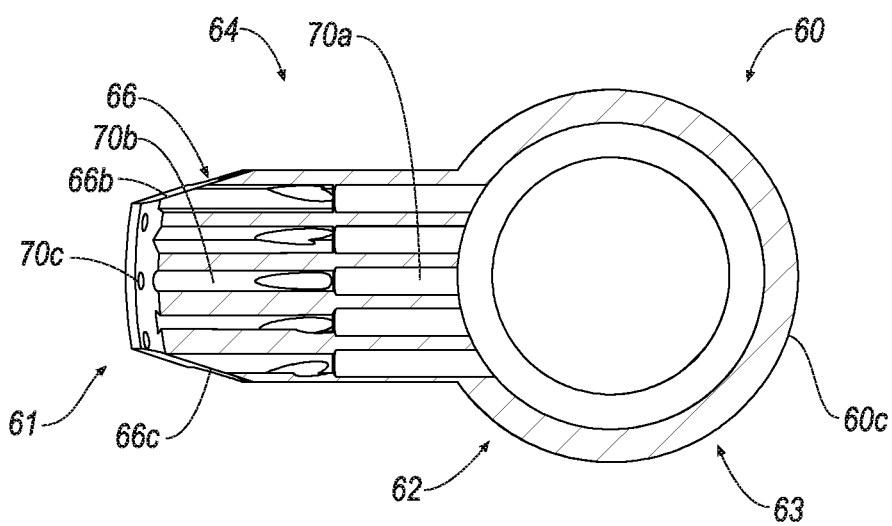
FIG. 12 is a cross-sectional view of the clamp taken along line 12-12 of FIG. 11.
Figure 13:
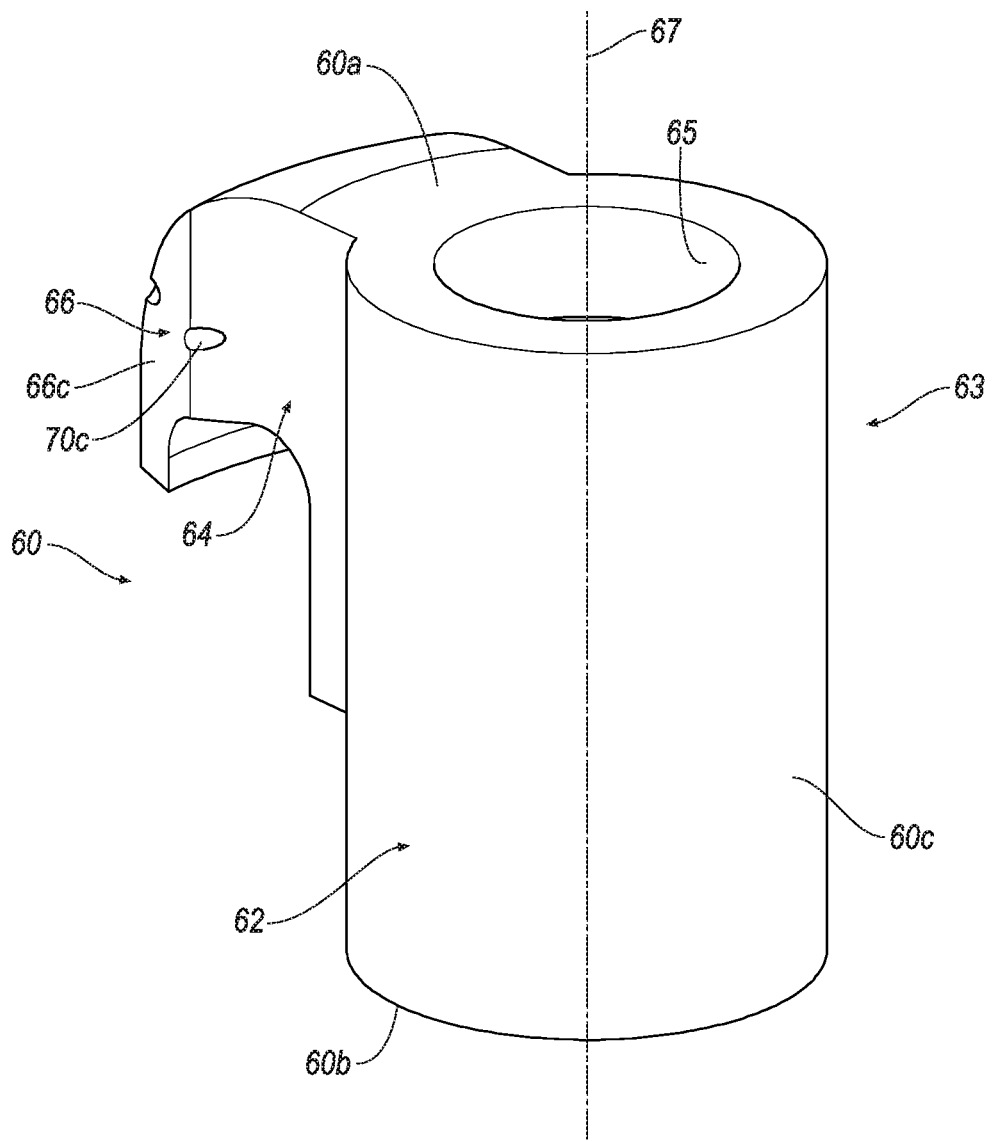
FIG. 13 is a rear isometric view of the clamp of FIG. 11.
Figure 14:
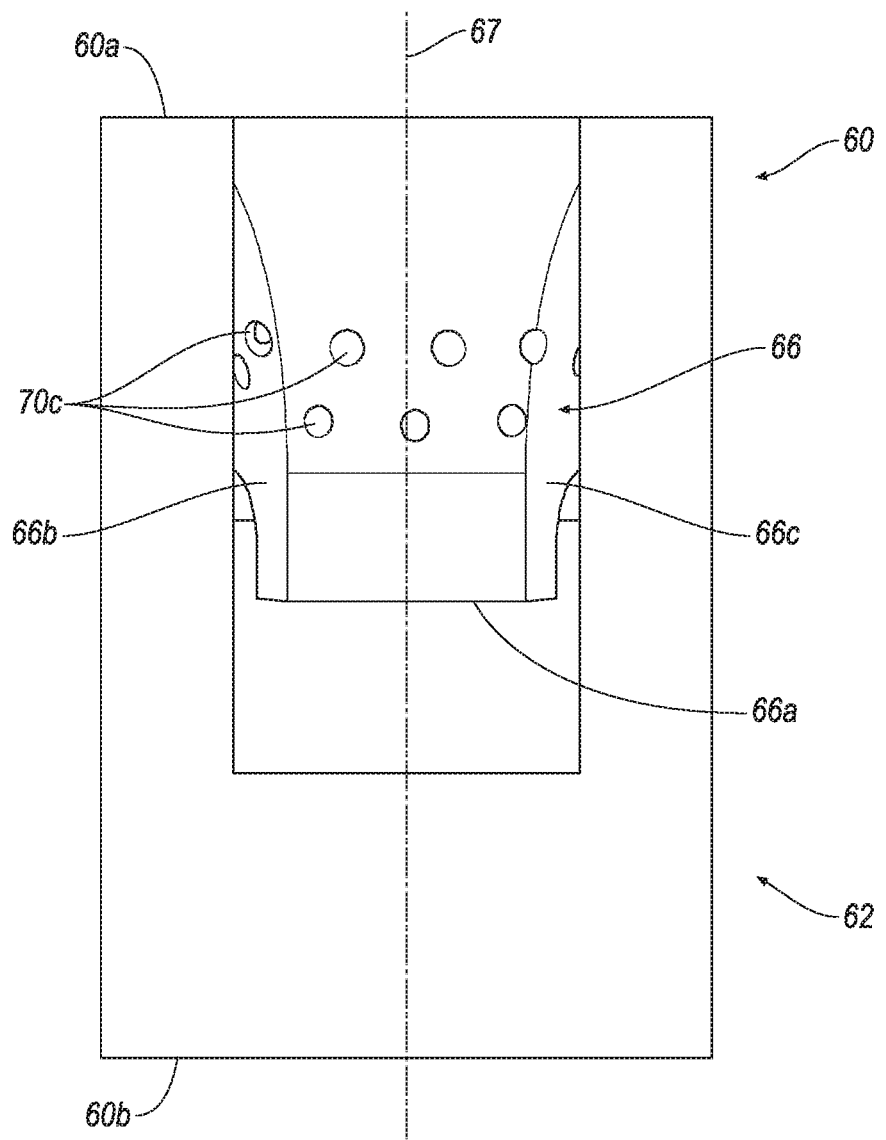
FIG. 14 is a front view of the clamp of FIG. 11.
Figure 15:
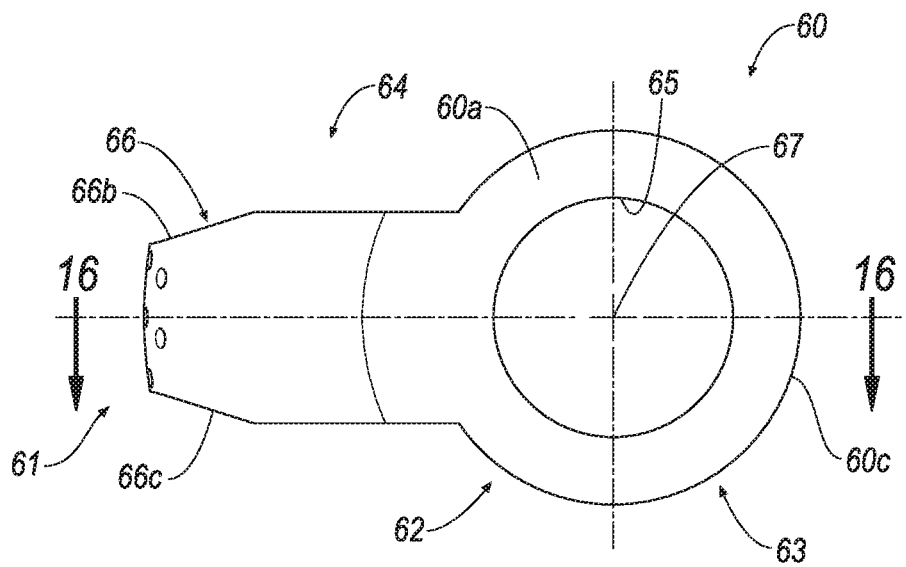
FIG. 15 is a top view of the clamp of FIG. 11.
Figure 16:
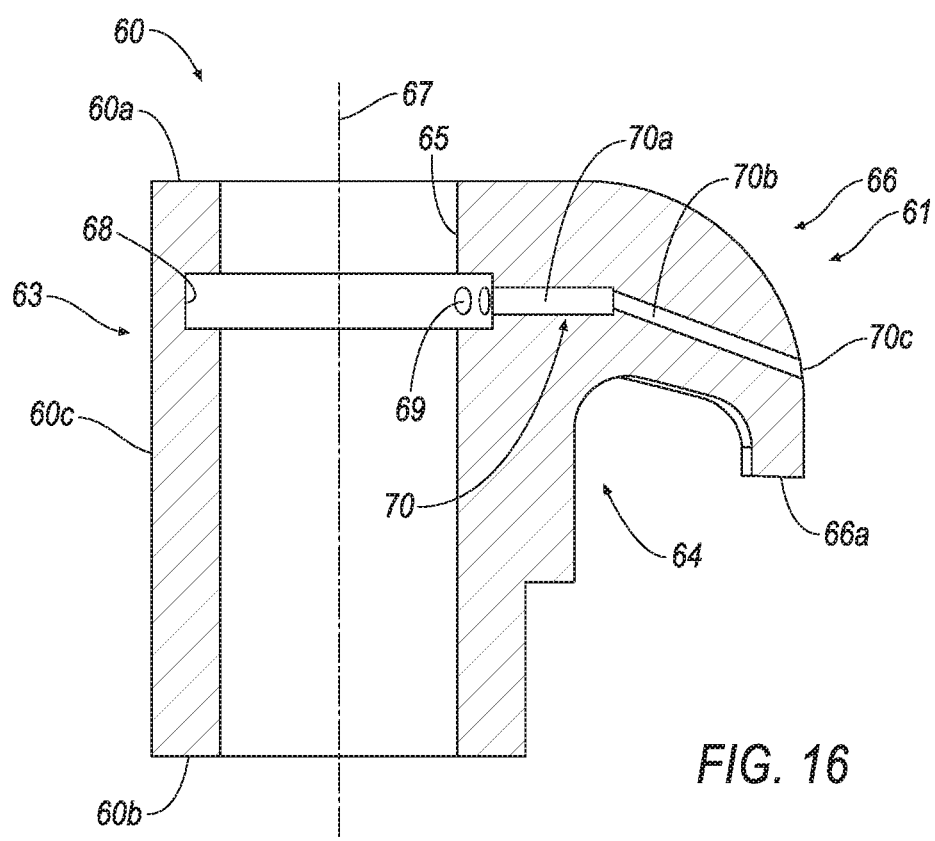
FIG. 16 is a cross-sectional view of the clamp taken along line 16-16 of FIG. 15.

One aspect of the invention is that the clamp 60 includes a plurality of coolant passages 70 with a first section 70a formed in the neck portion 64 that is in fluid communication with the coolant header 68, and a second section 70b extending from the first section 70b to an outlet port 70c, as shown in FIGS. 12 and 16. In the illustrated embodiment, the first section 70a of each coolant passage 70 is substantially perpendicular with respect to the central, longitudinal axis 67 of the clamp 60, and the second section 70b is non-perpendicular with respect to the central, longitudinal axis 67. However, it will be appreciated that both the first section 70a and the second section 70b can be formed to be perpendicular or non-perpendicular to the central, longitudinal axis 67.

Each coolant passage 70 is preferably formed by a 3-D printing technique, which allows one or more coolant passages 70 to have the same cross-sectional shape, or a different cross-sectional shape. That is, the one or more coolant passages 70 can have the same cross-sectional area or a different cross-sectional area. In doing so, the coolant flow through each of the coolant passages 70 can be optimized. For example, the coolant passages 70 can have a circular cross-sectional shape, an elliptical cross-sectional shape, an oval cross-sectional shape, a polygonal cross-sectional shape, and the like. In addition, the dimensions of each coolant passage 70 can be the same, or different. For example, in the embodiment where the coolant passages 70 have a substantially circular cross-sectional shape, each coolant passage 70 can have the same diameter, or one or more coolant passages 70 can have a different diameter. In one embodiment, for example, each coolant passage 70 has a circular cross-sectional shape with a diameter of about 0.034 inches (0.84 mm). In other words, each coolant passage 70 has a substantially identical cross-sectional area.

In addition, it is possible that the first section 70a can have a different cross-sectional shape than the second section 70b. For example, the first section 70a can have a substantially circular cross-sectional shape and the second section 70b can have a substantially elliptical cross-sectional shape.

Other combinations of cross-sectional shapes for the first section 70a and the second section 70b are within the scope of the invention.

Further, in one embodiment, the first section 70a and the second section 70b of each coolant passage 70 may extend substantially parallel with respect to each other. In another embodiment, the first section 70a of the coolant passages 48 may extend substantially parallel to each other and the second section 70b are not substantially parallel to each other, but diverge from each other until the outlet port 70c. In this embodiment, the coolant passages 70 can provide coolant in a fan-like pattern to the cutting insert-workpiece interface. In yet another embodiment, the first section 70a and the second section 70b of each coolant passage 70 may diverge from each other to provide coolant in a fan-like pattern to the cutting insert-workpiece interface.

It will be appreciated that the invention can be practiced with the clamp screw 40 having a coolant header, rather than the clamp 60. In this embodiment, the coolant header 68 of the clamp 60 would be eliminated, and the clamp screw 40 would include a coolant header in the form of a circumferential recess (not shown) formed in the threaded outer surface 42a of the upper portion 42, like the coolant header 68 of the clamp 60. Also, the coolant header in the clamp screw 40 would be in fluid communication with the coolant channels 54, and the coolant ports 56 would be eliminated.

In operation, coolant under pressure from the coolant source 34 enters the coolant opening 31. Coolant travels up the coolant opening 31 and into the coolant opening 50a of the clamp screw 40. Coolant then travels up the coolant passage 52 and into the transverse coolant channels 54 of the clamp screw 40. Coolant then travels into the coolant header 68 of the clamp 60 and into each of the plurality of coolant passages 70 of the clamp 60. The coolant then exits each of the outlet ports in a direction toward the cutting insert-workpiece interface. It is noted that the clamping tool holder 10 does not require sealing members, such as O-rings, and the like, to prevent leakage of the pressurized coolant. Rather, the threaded connection between the clamp screw 40 and the clamp 60 prevents leakage of coolant, thereby providing a simplified design as compared to conventional tool holders.

The patents and publications referred to herein are hereby incorporated by reference.

Having described presently preferred embodiments the invention may be otherwise embodied within the scope of the appended claims.

What is claimed is:

1. A tool holder, comprising:
a body including an insert-receiving pocket formed at a forward end thereof, the insert-receiving pocket having a bottom and at least one side wall for receiving a cutting insert, the forward end having a threaded clamp-receiving bore with a coolant opening for receiving pressurized coolant from a coolant source;
a clamp including a body portion, a neck portion, and a tapered nose portion, the body portion including a top surface and a bottom surface, a threaded aperture extending from the top surface to the bottom surface, the clamp further including a plurality of clamp coolant passages in fluid communication with the threaded aperture, each clamp coolant passage having an outlet port; and
a clamp screw threaded into the threaded aperture of the clamp and at least partially received in the threaded clamp-securing bore of the tool holder body, the clamp screw including a clamp screw coolant passage in fluid communication with the coolant opening of the body, and at least one coolant channel in fluid communication with the clamp screw coolant passage,
wherein each of the clamp coolant passages includes a first section formed in the neck portion, and a second section extending from the first section to the outlet port,
wherein coolant from the coolant source enters the coolant opening, travels into the clamp screw, travels into the clamp screw coolant passage, travels into the at least one coolant channel of the clamp screw, travels into each of the plurality of clamp coolant passages, and then exits through each outlet port in a direction toward a cutting insert-workpiece interface.

2. The tool holder according to claim 1, wherein the first sections of the clamp coolant passages and the second sections of the clamp coolant passages are parallel to each other.

3. The tool holder according to claim 1, wherein the first sections of the clamp coolant passages are parallel to each other, and wherein the second sections of the clamp coolant passages diverge from each other, thereby providing coolant in a fan-like pattern to the cutting insert-workpiece interface.

4. The tool holder according to claim 1, wherein the first sections of the clamp coolant passages diverge from each other and the second sections of the clamp coolant passages diverge from each other, thereby providing coolant to the cutting insert-workpiece interface in a fan-like pattern.

5. The tool holder according to claim 1, wherein the first section of each of the clamp coolant passages is perpendicular with respect to a central, longitudinal axis of the clamp, and wherein the second section of each of the clamp coolant passages is non-perpendicular with respect to the central, longitudinal axis.

6. The tool holder according to claim 1, wherein at least one coolant passage has a circular cross-sectional shape.

7. The tool holder according to claim 1, wherein at least one coolant passage has a non-circular cross-sectional shape.

8. The tool holder according to claim 1, wherein the plurality of coolant passages are formed by a 3D printing technique.

9. The tool holder according to claim 1, wherein the clamp further includes a coolant header with at least one opening.

10. A clamp for a tool holder comprising a body portion, a neck portion, and a tapered nose portion, the body portion including a top surface and a bottom surface, a threaded aperture extending from the top surface to the bottom surface, the clamp further including a plurality of clamp coolant passages in fluid communication with the threaded aperture, each clamp coolant passage having an outlet port for providing coolant to a cutting insert-workpiece interface,
wherein each of the clamp coolant passages includes a first section formed in the neck portion, and a second section extending from the first section to the outlet port.

11. The clamp according to claim 10, wherein the first sections of the clamp coolant passages and the second sections of the clamp coolant passages are parallel to each other.

12. The clamp according to claim 10, wherein the first sections of the clamp coolant passages are parallel to each other, and wherein the second sections of the clamp coolant passages diverge from each other, thereby providing coolant in a fan-like pattern to the cutting insert-workpiece interface.

13. The clamp according to claim 10, wherein the first sections of the clamp coolant passages diverge from each other and the second sections of the clamp coolant passages diverge from each other, thereby providing coolant to the cutting insert-workpiece interface in a fan-like pattern.

14. The clamp according to claim 10, wherein the first section of each of the clamp coolant passages is perpendicular with respect to a central, longitudinal axis of the clamp, and wherein the second section of each of the clamp coolant passages is non-perpendicular with respect to the central, longitudinal axis.

15. The clamp according to claim 10, wherein at least one coolant passage has a circular cross-sectional shape.

16. The clamp according to claim 10, wherein at least one coolant passage has a non-circular cross-sectional shape.

17. The clamp according to claim 10, wherein the plurality of coolant passages are formed by a 3D printing technique.

18. The clamp according to claim 10, wherein the clamp further includes a coolant header with at least one opening.

* * * * *